United States Patent
Forsyth

(10) Patent No.: US 6,324,930 B1
(45) Date of Patent: Dec. 4, 2001

(54) GEAR ASSEMBLY

(75) Inventor: John R. Forsyth, Romeo, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/533,626

(22) Filed: Mar. 22, 2000

(51) Int. Cl.$^7$ .......................... F16H 55/12; F16H 55/00; F16D 11/00
(52) U.S. Cl. .......................... 74/446; 74/432; 192/53.32
(58) Field of Search .............................. 192/53.32, 53.34; 74/432, 439, 446, 447

(56) References Cited

U.S. PATENT DOCUMENTS

| | | | |
|---|---|---|---|
| 2,864,476 | * 12/1958 | Ashauer et al. | 192/53.34 |
| 3,286,801 | * 11/1966 | Wojcikowski | 192/53.32 |
| 4,077,274 | * 3/1978 | Johnson | 74/446 X |
| 4,326,849 | * 4/1982 | Van Zijderveld | 74/447 X |
| 4,445,602 | * 5/1984 | Chana | 192/53.343 X |
| 4,805,755 | * 2/1989 | Fukumoto et al. | 192/53.32 |
| 4,901,835 | 2/1990 | Frost . | |
| 4,912,998 | * 4/1990 | Sugano et al. | 74/446 X |
| 5,060,539 | * 10/1991 | Cissell et al. | 74/640 |
| 5,085,303 | 2/1992 | Frost . | |
| 5,105,927 | 4/1992 | Frost . | |
| 5,135,087 | 8/1992 | Frost . | |
| 5,452,622 | * 9/1995 | Fenelon | 74/432 X |
| 5,638,930 | 6/1997 | Parsons . | |
| 5,758,753 | 6/1998 | Sypula et al. . | |
| 5,906,135 | * 5/1999 | Prater | 74/446 |
| 5,975,263 | 11/1999 | Forsyth . | |
| 5,983,741 | 11/1999 | Warwick et al. . | |
| 6,053,060 | * 4/2000 | Tumberlinson et al. | 74/446 X |

FOREIGN PATENT DOCUMENTS

1013665 * 4/1983 (RU) ...................................... 74/446

* cited by examiner

Primary Examiner—Sherry Estremsky
Assistant Examiner—Roger Pang
(74) Attorney, Agent, or Firm—Harness, Dickey & Pierce, P.L.C.

(57) ABSTRACT

A gear assembly having a body member with an end wall interconnecting a cylindrical inner wall and a cylindrical outer wall so as to define an annular cavity. The gear assembly also includes a gear ring having a hub segment mounted on and fixed to the outer wall of the body member, and a gear segment having external gear teeth. The gear assembly also includes a clutch ring that is secured to the inner and outer walls of the body member for enclosing the cavity. The clutch ring has clutch teeth adapted for engagement with a shift sleeve associated with a gearshift system.

24 Claims, 4 Drawing Sheets

GEAR ASSEMBLY

BACKGROUND OF THE INVENTION

1. Technical Field

The present invention generally relates to gears for use in power transmission assemblies such as motor vehicle transmissions and transfer cases. More particularly, the present invention relates to a multi-piece gear assembly having reduced weight and rotational inertia which can be economically manufactured for replacement of conventional monoblock gears.

2. Discussion

Gear manufacture is a time-consuming and expensive process. Much of the cost associated with gear manufacturing arises from the cost of the gear material. Traditionally, gears are constructed from a homogeneous gear blank obtained from a billet of high alloy gear steel such as, for example, SAE 8620. While superior mechanical properties such as hardenability and fatigue strength are desirable in the gear tooth portion of such monoblock gear, these particular mechanical properties are not required throughout the remainder of the gear. In addition, when a gear is fabricated from a single material an undesirably large rotational moment of inertia results. As the rotational moment of inertia increases, so does the amount of energy required to start and stop rotation of the gear. Accordingly, a gear having a reduced rotational moment of inertia is desirable for production of an energy efficient power transmission device.

While gears having a reduced rotational moment of inertia are known in the art, such designs have certain disadvantages. For example, it is known to machine a relief into the central web portion of the gear in order to reduce its weight and rotational moment of inertia. While this method accomplishes the task of reducing the rotational moment of inertia, the overall gear design may be compromised. Specifically, the remaining web section may have been reduced to the point that subsequent heat treatment operations will cause deformation of the gear body and tooth form. This may result in a need for hard finishing of the gear form thus adding significant costs.

Other methods employed to reduce the weight and rotational moment of inertia of gears include utilization of different materials. In this regard, some composite materials such as fiber reinforced plastic, have been successful in some light duty applications. However, the heat and stress induced on the teeth of gears used in power transmission assemblies, such as motor vehicle transmissions and transfer cases, exceeds the allowable limits for most known composite materials. As such, composite gears have had only limited application in motor vehicles.

SUMMARY OF THE INVENTION

It is therefore an object of the invention to overcome the disadvantages associated with conventional gears by providing an improved gear assembly having reduced weight and rotational moment of inertia.

It is another object of the present invention to provide a multi-piece gear assembly with the components constructed from different materials.

The present invention includes a gear assembly having a body member with an end wall interconnecting a cylindrical inner wall and a cylindrical outer wall so as to define an annular cavity. The gear assembly also includes a gear ring having a hub segment mounted on and fixed to the outer wall of the body member and a gear segment having external gear teeth. The gear assembly also includes a clutch ring that is secured to the inner and outer walls of the body member for enclosing the cavity. The clutch ring has clutch teeth adapted for engagement with a shift sleeve associated with a gearshift system for releasably coupling the gear assembly to a drive shaft.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
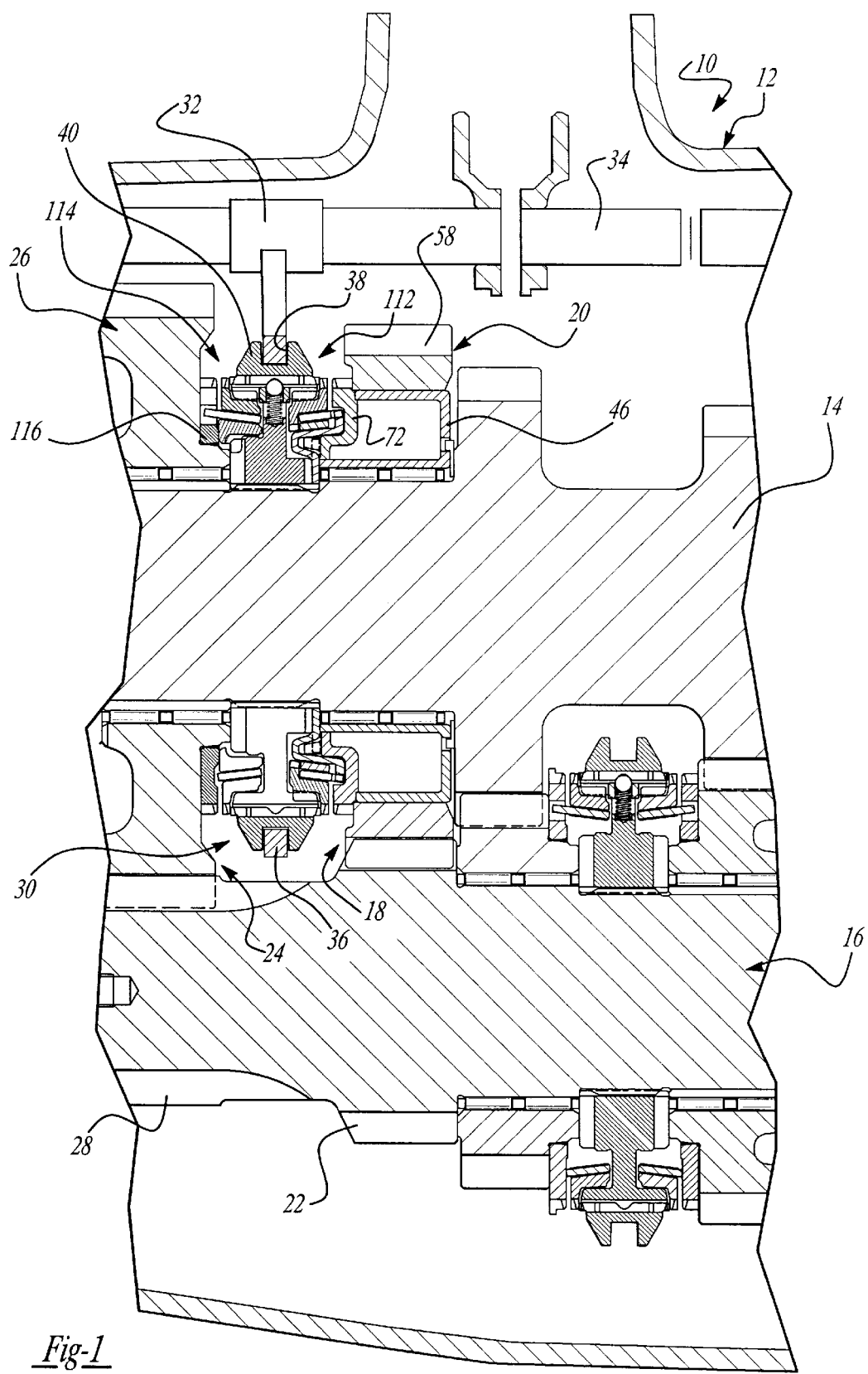
FIG. 1 is a partial sectional view of an exemplary manual transmission equipped with a gear assembly according to the present invention.
Figure 2:
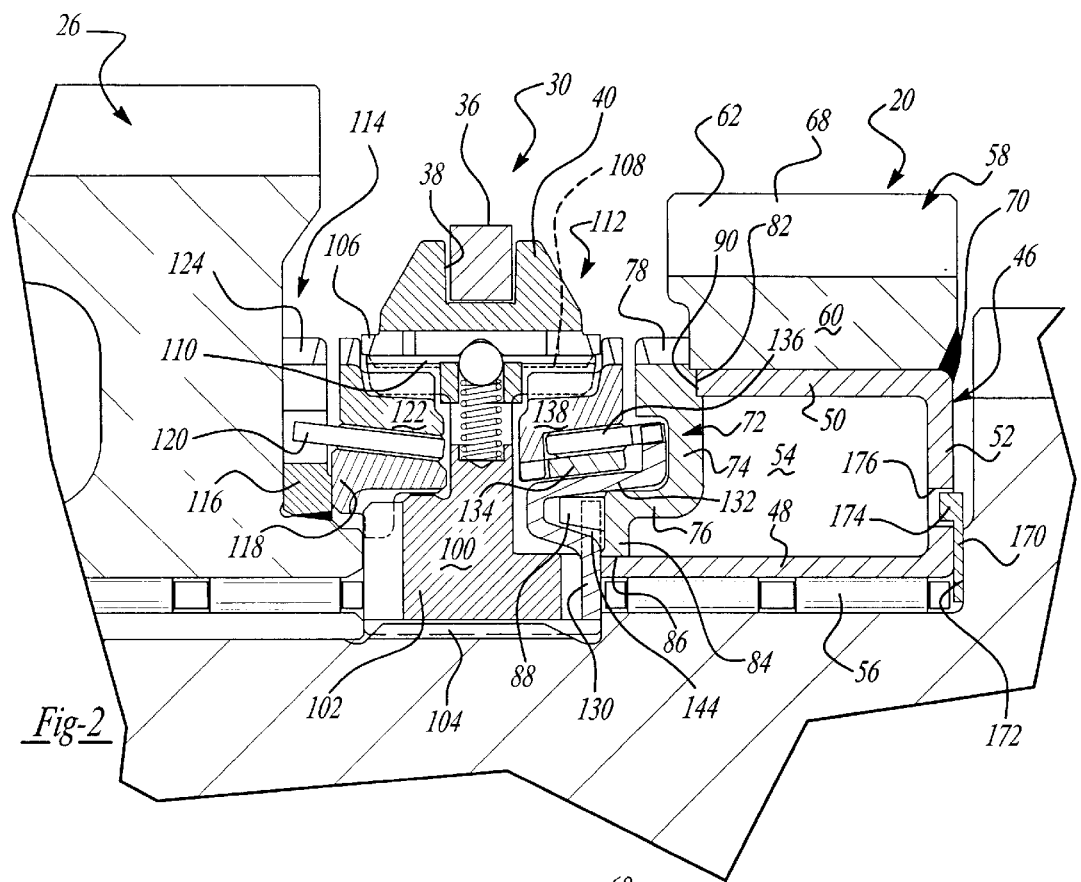
FIG. 2 is an enlarged portion of FIG. 1 showing the components of the gear assembly in greater detail.

With initial reference to FIGS. 1 and 2, a portion of a multi-speed synchromesh gearbox of the type used in motor vehicles is shown generally at 10. Gearbox 10 can be a transmission for use in RWD vehicles or a transaxle for use in FWD vehicles. Gearbox 10 includes a housing 12 which rotatably supports a first shaft 14 and a second shaft 16. As seen, a plurality of constant mesh gearsets are located between shafts 14 and 16. In particular, a first gearset 18 includes a first speed gear 20 rotatably supported on first shaft 14 that is meshed with a first output gear 22 fixed to or integrally formed on second shaft 16. Likewise a second gearset 24 includes a second speed gear 26 rotatably supported on first shaft 14 that is meshed with a second output gear 28 fixed to or integrally formed on second shaft 16. For clarity of explanation, first speed gear 20 is a multi-piece gear assembly constructed according to the present invention while a second speed gear 26 is a mono-block gear constructed in a conventional manner. One skilled in the art will appreciate that one or more gear assemblies similar to first speed gear 20 may be utilized in gearbox 10 without departing from the scope of the invention. In addition, a synchronizer clutch 30 is shown mounted on first shaft 14 between first speed gear 20 and second speed gear 26. Synchronizer clutch 30 is actuated by means of a shift fork 32, which is mounted on a shift selector rail 34. As is conventional in multi-speed transmissions, a gear shift system (not shown) is used to slide shift rail 34 in fore and aft directions. Thus, shift fork 32 is longitudinally slidable with shift rail 34 and is connected by a yoke portion 36 which is retained in a circumferential groove 38 formed in a shift sleeve 40 associated with synchronizer clutch 30. As is conventional, shift sleeve 40 is operable in a first position to releasably couple first speed gear 20 for rotation with first shaft 14 so as to transfer rotary power from first shaft 14 through first gearset 18 to second shaft 16 and establish a first speed ratio drive connection therebetween. Likewise, shift sleeve 40 is operable in a second position to releasably couple second speed gear 26 to first shaft 14 for transferring rotary power from first shaft 14 through second gearset 24 to second shaft 16 and establish a second speed ratio drive connection therebetween.

Figure 3:
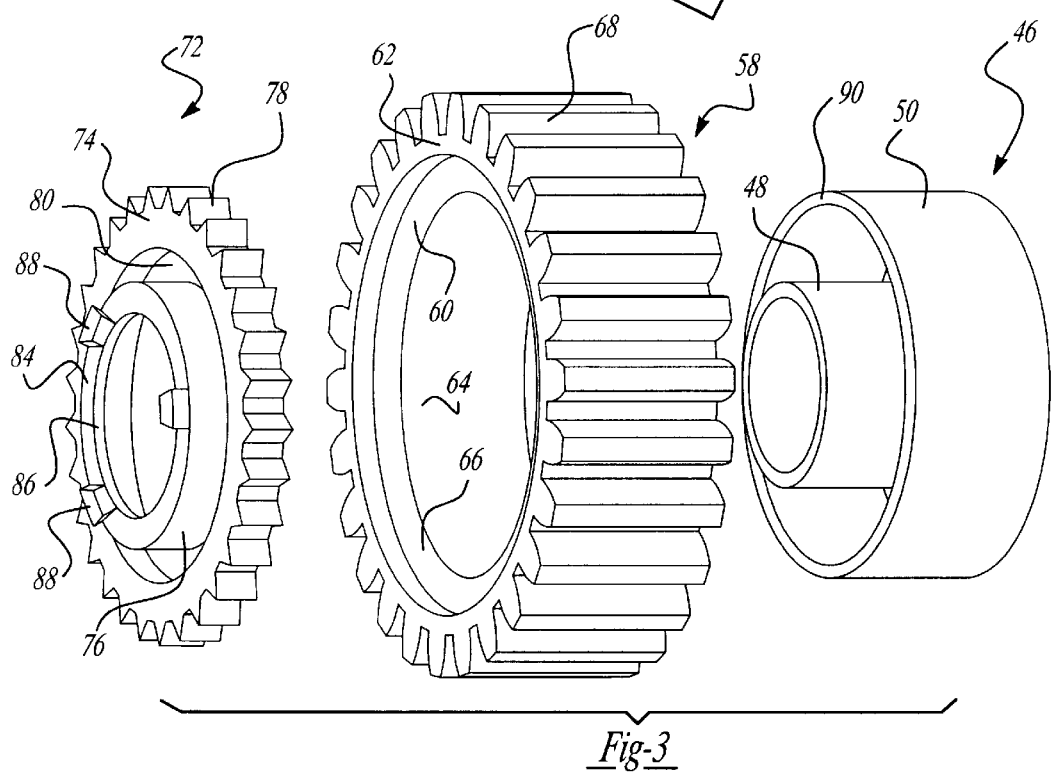
FIG. 3 is an exploded perspective view of the gear assembly shown in FIG. 2.

As best seen in FIGS. 2 and 3, gear assembly 20 includes a hollow body member or drum 46 having a cylindrical inner wall 48 and a cylindrical outer wall 50 interconnected by a circular end wall 52 so as to define a ring-shaped annular chamber 54. Inner wall 48 is shown to be rotatably supported on first shaft 14 by a bearing assembly 56. Drum 46 is preferably stamped from a high strength, low alloy steel having favorable weldability characteristics. One preferred material is SAE J 1442, Grade 345F.

Gear assembly 20 also includes a gear ring 58 having a hub segment 60 and a gear segment 62. Hub segment 60 includes a cylindrical wall surface 64 and a recessed face surface 66. Gear segment 62 is integral with hub segment 60 and includes gear teeth 68 which mesh with the gear teeth of first output gear 22. As shown in FIG. 2, hub segment 60 of gear ring 58 is mounted on and rigidly secured to outer wall 50 of drum 46, such as by a weld joint 70. Due to the magnitude and frequency of the loads input to gear teeth 68, gear ring 58 is preferably constructed from a gear steel such as, for example, SAE 4023, SAE 8620, or equivalent, in order to provide hardened wear surfaces on the gear teeth. One skilled in the art will appreciate that a costly material, such as SAE 8620, is no longer required for the entire gear since gear ring 58 and drum 46 of gear assembly 20 are constructed from different materials. Specifically, SAE 8620 is commonly specified for use in conventional monoblock-type gears based on its superior toughness, tensile strength and hardenability characteristics. However, because gear assembly 20 is fabricated from separate components, only gear ring 58 need possess the costly mechanical properties previously required for the entire gear.

Referring still to FIGS. 2 and 3, gear assembly 20 is shown to also include a clutch ring 72 having a plate segment 74 and a cup-shaped hub segment 76. Plate segment 74 has clutch teeth 78 formed at its outer peripheral edge and further includes a first annular recess 80 and a second annular recess 82. Hub segment 76 includes an end wall 84 having a circumferential inner wall surface 86 defining an aperture. In addition, a plurality of axially extending lugs 88 are provided on end wall 84 of hub segment 76. Lugs 88 are equally spaced and extend from a front face surface of end wall 88. As best seen from FIG. 2, clutch ring 72 is aligned relative to drum 46 such that inner wall surface 86 of hub segment 76 is seated on inner wall 48 of drum 46 and an end surface 90 of drum outer wall 50 is seated in second recess 82. Suitable methods known in the art, such as welding, are used to rigidly secure clutch ring 72 to drum 46.

Figure 4:
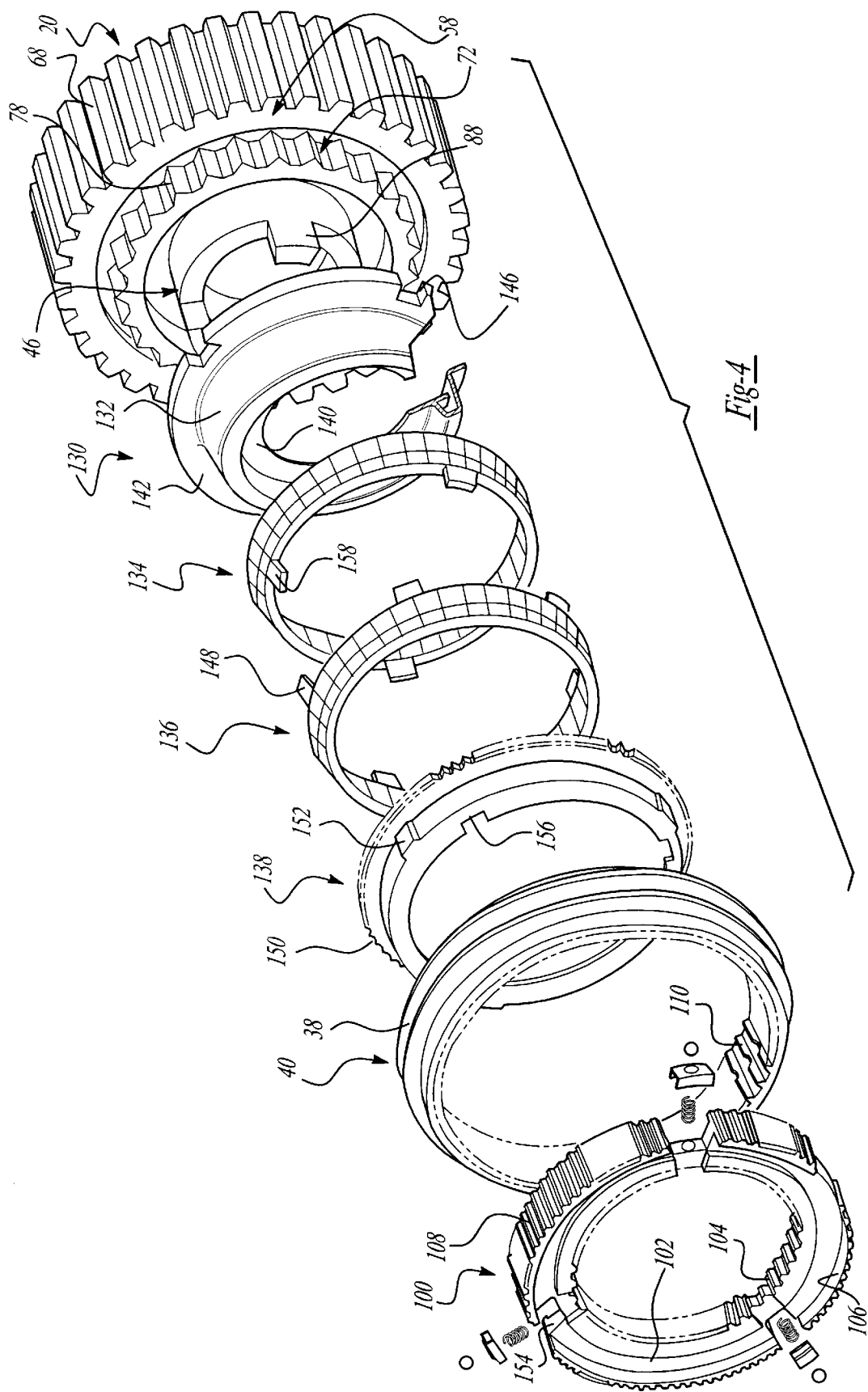
FIG. 4 is an exploded perspective view of a synchronizer clutch adapted for use in conjunction with the gear assembly of the present invention.

As best seen from FIGS. 2 and 4, bidirectional synchronizer clutch 30 includes a clutch hub 100 having a ring segment 102 fixed for rotation with first shaft 14 via a splined connection 104. Clutch hub 100 also has a longitudinally extending ring segment 106 having external splines 108 formed thereon. Shift sleeve 40 is mounted for rotation with clutch hub 100 by means of its internal splines 110 being in sliding intermeshed engagement with external splines 108. Thus, shift sleeve 40 is axially moveable in the fore or aft directions on clutch hub 100 by means of corresponding movement of shift fork 32.

Synchronizer clutch 30 also includes a first synchronizer assembly 112 operably disposed between clutch hub 100 and gear assembly 20, and a second synchronizer assembly 114 operably disposed between clutch hub 100 and a clutch gear 116 fixed to second speed gear 26. Second synchronizer assembly 114 is a conventional double cone arrangement having an inner cone ring 118 keyed for rotation with clutch hub 100, a friction cone ring 120 keyed for rotation with clutch gear 116, and a blocker ring 122 keyed for rotation with clutch hub 100. As is known, axial sliding movement of shift sleeve 40 from the central non-engaged position shown toward second speed gear 26 causes frictional engagement of mating surfaces associated with cone rings 118 and 120, and blocker ring 122 for synchronizing the rotary speed of second speed gear 26 to that of first shaft 14. Thereafter, internal splines 110 on shift sleeve 40 are permitted to move into meshed engagement with clutch teeth 124 on clutch gear 116.

In contrast to the conventional construction of second synchronizer assembly 114, first synchronizer assembly 112 is shown as a triple-cone arrangement comprised of a thrust washer 130 defining an inner cone segment 132, an intermediate cone ring 134, a friction cone ring 136, and a blocker ring 138. Thrust washer 130 includes first and second ring segments 140 and 142, respectively, which border cone segment 132. A plurality of notches 144 are formed in first ring segment 140 and are sized to receive a corresponding number of lugs 88 on clutch ring 72 such that thrust washer 130 rotates with gear assembly 20. Additionally, notches 146 formed in second ring segment 142 of thrust washer 130 are sized to receive lugs 148 extending from friction cone ring 136 such that friction cone ring 136 is coupled for rotation with gear assembly 20. Blocker ring 138 is shown to include blocking teeth 150 and a plurality of lugs 152 which are sized for receipt in notches 154 formed in clutch hub 100. Blocker ring 138 also includes notches 156 that are sized to receive lugs 158 extending from intermediate cone ring 134. Thus, blocker ring 138 and intermediate cone ring 134 are coupled for rotation with first shaft 14. In view of this arrangement, initial axial movement of shift sleeve 40 from its central non-engaged position toward gear assembly 20 causes blocker ring 138 to index or "clock" until a side face surface of lugs 152 engage a corresponding edge surface of notches 154 in clutch hub 100, whereby blocking teeth 150 prevent splines 110 on shift sleeve 40 from passing therethrough. Once the speed synchronization process is complete, spline teeth 110 on shift sleeve 40 are permitted to move through blocking teeth 150 and into meshed engagement with clutch teeth 78 on clutch ring 72. Speed synchronization occurs due to frictional engagement between the three conical surface interfaces established between the components of synchronizer assembly 112. These frictional interfaces include a first surface interface between inner cone segment 132 of thrust washer 130 and intermediate cone ring 134, a second surface interface between intermediate cone ring 134 and friction cone ring 136, and a third surface interface between friction cone ring 136 and blocker ring 138. In addition, the edge contour of the various interdigitated notches and lugs can be tapered to generate a servo action for improving the speed synchronization process.

As mentioned earlier and in order to fully benefit from the composite nature of gear assembly 20, drum 46 is preferably drawn from a low carbon steel that does not require subsequent heat treatment. Therefore, as specifically shown in FIG. 2, to assure long life and wear resistance, a thrust washer 170 is positioned between end wall 52 of drum 46 and a thrust surface 172 on first shaft 14. Thrust washer 170 includes one or more tabs 174 disposed within apertures 176 formed in end wall 52 to assure that relative motion occurs between the machined and hardened thrust surface 172 of shaft 14 and thrust washer 170. In an effort to reduce weight and noise generated from transmission 10, washer 170 is preferably made from a wear-resistant composite material.

Figure 5:
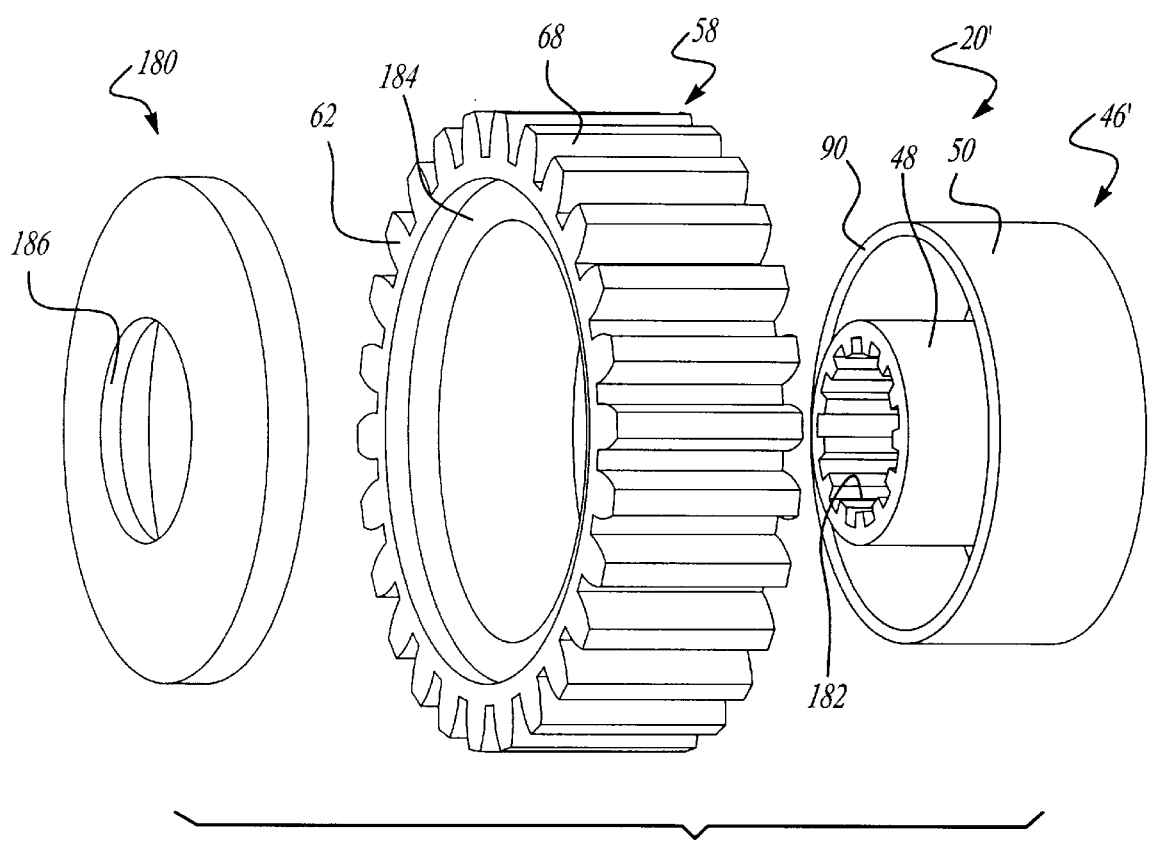
FIG. 5 is an exploded perspective view of a gear assembly according to an alternative construction.

Gear assembly 20 of the present invention has, up to this point, been shown and described to utilize clutch ring 72 for gears of the type that are releasably engageable with a rotary shaft via movement of some kind of a dog clutch arrangement. However, gear assembly 20' could be modified, as shown in FIG. 5, to include an end plate 180 for gear applications where releasable engagement is not required. As seen, drum 46' of gear assembly 20' includes internal splines 182 formed on inner wall 48 for engagement with external splines on a rotary shaft. Thus, it is contemplated that first output gear 22 could be replaced with gear assembly 20' splined to shaft 16 if a multi-piece output gear is desired. End plate 180 would be mounted in a recess 184 formed in gear ring 58 and secured thereto such as by welding. Likewise, an aperture 186 in end plate 180 would be mounted on inner wall 48 of drum 46'.

The gear assemblies of the present invention are advantageous in that the multi-piece construction allows numerous different gear assemblies to be made from common components. For example, this "modularity" permits gear rings having different tooth types (i.e., spur, helical, etc.) and geometries (i.e., number of teeth, pitch, etc.) to be mounted to a common drum. Similar use of the same or different clutch rings is also possible. Thus, the present invention provides for modular assembly of gears for use in all types of power transfer devices.

The invention being thus described, it will be obvious that the same may be varied in many ways. Such inventions are not to be regarded as a departure from the spirit and scope of the invention, and all such modifications as would be obvious to one skilled in the art are intended to be included within the scope of the following claims.

What is claimed is:

1. A gear assembly adapted to be mounted on a shaft, comprising:
   a drum having an inner cylindrical wall adapted to be mounted on the shaft, an outer cylindrical wall, and an end wall interconnecting said inner and outer walls;
   a gear ring including a hub segment mounted on and fixed to said outer wall of said drum, and a gear segment having gear teeth formed thereon; and
   a clutch ring having clutch teeth formed thereon, said clutch ring fixed to said inner and outer walls of said drum.

2. The gear assembly of claim 1 wherein said drum and said gear ring are made from different materials.

3. The gear assembly of claim 1 wherein said inner wall of said drum is rotatably supported on the shaft.

4. The gear assembly of claim 1 wherein said clutch ring has a plate segment fixed to said outer wall of said drum and a hub segment fixed to said inner wall of said drum, and wherein said clutch teeth are formed on an outer peripheral edge of said plate segment.

5. The gear assembly of claim 1 wherein said hub segment of said gear ring is welded to at least one of said end wall and said outer wall of said drum.

6. The gear assembly of claim 1 further comprising a thrust washer fixed to an outer surface of said end wall of said drum.

7. The gear assembly of claim 1 wherein said clutch ring has an annular recess which receives and locates a terminal end surface of said outer wall of said drum.

8. The gear assembly of claim 1 wherein said drum is stamped from a high strength low alloy steel.

9. A gear assembly adapted to be mounted on a shaft, comprising:
   a drum having an inner cylindrical wall adapted to be mounted on the shaft, an outer cylindrical wall, and an end wall interconnecting said inner and outer walls said end wall including a thrust washer fixed to an outer surface thereof;
   a gear ring including a hub segment mounted on and fixed to said outer wall of said drum, and a gear segment having gear teeth formed thereon; and
   an end plate fixed to said inner and outer walls of said drum.

10. The gear assembly of claim 9 wherein said drum and said gear ring are made from different materials.

11. The gear assembly of claim 9 wherein said inner wall of said drum is rotatably supported on the shaft.

12. The gear assembly of claim 9 wherein said end plate is a clutch ring having clutch teeth formed thereon.

13. The gear assembly of claim 12 wherein said clutch ring has a plate segment fixed to said outer wall of said drum and a hub segment fixed to said inner wall of said drum, and wherein said clutch teeth are formed on an outer peripheral edge of said plate segment.

14. The gear assembly of claim 9 wherein said hub segment of said gear ring is welded to at least one of said end wall and said outer wall of said drum.

15. The gear assembly of claim 9 wherein said end plate has an annular recess which receives and locates a terminal end surface of said outer wall of said drum.

16. The gear assembly of claim 9 wherein said drum is stamped from a high strength low alloy steel .

17. A gear assembly adapted to be mounted on a shaft, comprising:
   a drum having an inner cylindrical wall adapted to be mounted on the shaft, an outer cylindrical wall, and an end wall interconnecting said inner and outer walls;
   a gear ring including a hub segment mounted on and fixed to said outer wall of said drum, and a gear segment having gear teeth formed thereon; and
   an end plate fixed to said inner and outer walls of said drum said end plate including an annular recess which receives and locates a terminal end surface of said outer wall.

18. The gear assembly of claim 17 wherein said drum and said gear ring are made from different materials.

19. The gear assembly of claim 17 wherein said inner wall of said drum is rotatably supported on the shaft.

20. The gear assembly of claim 17 wherein said end plate is a clutch ring having clutch teeth formed thereon.

21. The gear assembly of claim 17 wherein said clutch ring has a plate segment fixed to said outer wall of said drum and a hub segment fixed to said inner wall of said drum, and wherein said clutch teeth are formed on an outer peripheral edge of said plate segment.

22. The gear assembly of claim 17 wherein said hub segment of said gear ring is welded to at least one of said end wall and said outer wall of said drum.

23. The gear assembly of claim 17 further comprising a thrust washer fixed to an outer surface of said end wall of said drum.

24. The gear assembly of claim 17 wherein said drum is stamped from a high strength low alloy steel.

* * * * *